United States Patent
Lin et al.

(10) Patent No.: US 10,091,074 B2
(45) Date of Patent: Oct. 2, 2018

(54) HARDWARE ACCELERATION ARCHITECTURE FOR SIGNATURE MATCHING APPLICATIONS FOR DEEP PACKET INSPECTION

(71) Applicant: INTEL CORPORATION, Santa Clara, CA (US)

(72) Inventors: Pinxing Lin, Singapore (SG); Shiva Shankar Subramanian, Singapore (SG)

(73) Assignee: Intel Corporation, Santa Clara, CA (US)

(*) Notice: Subject to any disclaimer, the term of this patent is extended or adjusted under 35 U.S.C. 154(b) by 123 days.

(21) Appl. No.: 15/199,210

(22) Filed: Jun. 30, 2016

(65) Prior Publication Data
US 2018/0006907 A1    Jan. 4, 2018

(51) Int. Cl.
$H04L\ 12/26$  (2006.01)
$H04L\ 29/06$  (2006.01)
$G06F\ 17/30$  (2006.01)

(52) U.S. Cl.
CPC ...... *H04L 43/028* (2013.01); *G06F 17/30867* (2013.01); *H04L 63/1408* (2013.01); *H04L 69/22* (2013.01)

(58) Field of Classification Search
CPC combination set(s) only.
See application file for complete search history.

(56) References Cited

U.S. PATENT DOCUMENTS

| | | |
|---|---|---|
| 9,083,740 B1 | 7/2015 | Ma |
| 9,582,756 B2 | 2/2017 | Dubrovsky |
| 2011/0016154 A1 | 1/2011 | Goyal et al. |
| 2012/0221497 A1 | 8/2012 | Goyal et al. |

(Continued)

OTHER PUBLICATIONS

Qi et al., FEACAN: Front-End Acceleration for Content-Aware Network Processing, IEEE INFOCOM 2011, p. 2114-2122 (Year: 2011).*

(Continued)

*Primary Examiner* — Alex Skripnikov
*Assistant Examiner* — Sharmin Chowdhury
(74) *Attorney, Agent, or Firm* — Eschweiler & Potashnik, LLC

(57) ABSTRACT

A signature matching hardware accelerator system comprising one or more hardware accelerator circuits, wherein each of the hardware accelerator circuit utilizes a compressed deterministic finite automata (DFA) comprising a state table representing a database of digital signatures defined by a plurality of states and a plurality of characters, wherein the plurality of states are divided into groups, each group comprising a leader state having a plurality of leader state transitions and one or more member states, each having a plurality of member state transitions is disclosed. The hardware accelerator circuit comprises a memory circuit configured to store the leader state transitions within each group of the compressed DFA, only the member state transitions that are different from the leader state transitions for a respective character within each group of the compressed DFA and a plurality of member transition bitmasks associated respectively with the plurality of member state transitions.

25 Claims, 9 Drawing Sheets

(56) References Cited

U.S. PATENT DOCUMENTS

2013/0136127 A1    5/2013  Hill et al.

OTHER PUBLICATIONS

Extended European Search Report dated Oct. 24, 2017 in connection with European Application No. 17173855.2-1853, p. 1-5.
Qi, Yaxuan et al. "FEACAN: Front-end acceleration for content-aware network processing." Conference Paper in Proceedings—IEEE Infocom. Apr. 2011, 12 pages.
"Deep Packet Inspection." Wikipedia. Retrieved from https://en.wikipedia.org/wiki/Deep_packet_inspection. 11 pages.
Non-final Office Action dated Feb. 5, 2018 in connection with U.S. Appl. No. 15/199,111.
Notice of Allowance dated Aug. 14, 2018 in connection with U.S. Appl. No. 15/199,111.

\* cited by examiner

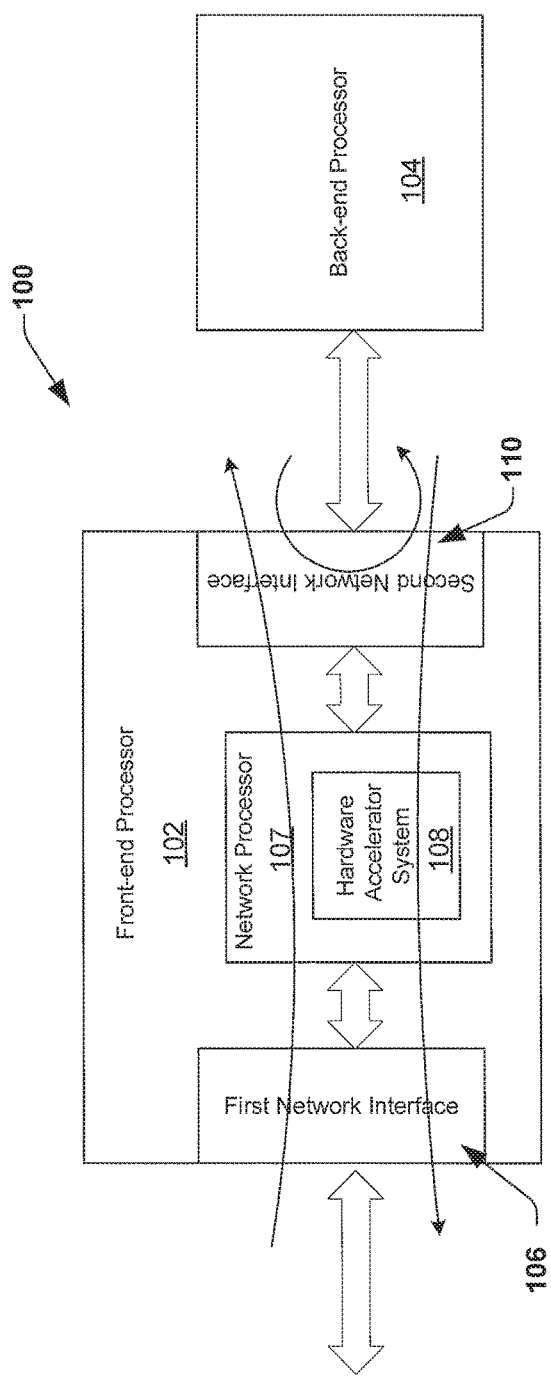
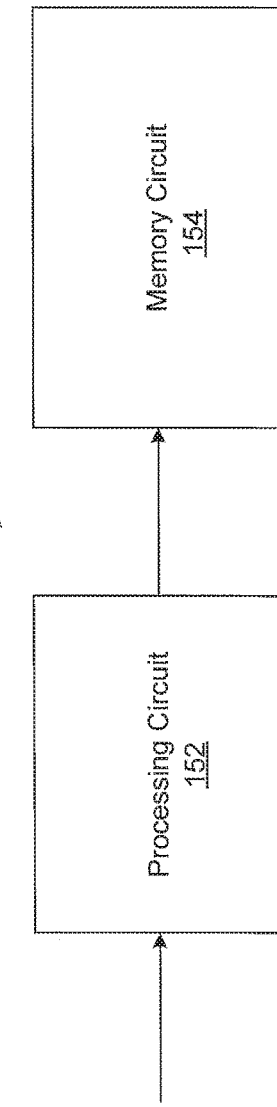
FIG. 1a
FIG. 1b

Fig. 2a

| | 0 | 1 | 2 | 3 | 4 | 5 | 6 | 7 |
|---|---|---|---|---|---|---|---|---|
| 0 | 1 | 1 | 1 | 1 | 1 | 1 | 1 | 1 |
| 1 | 1 | 1 | 1 | 1 | 1 | 1 | 1 | 1 |
| 2 | 1 | 1 | 1 | 1 | 1 | 1 | 1 | 1 |
| 3 | 1 | 1 | 1 | 1 | 1 | 1 | 1 | 1 |
| 4 | 1 | 1 | 1 | 1 | 1 | 1 | 1 | 1 |
| 5 | 1 | 1 | 1 | 1 | 1 | 1 | 1 | 1 |
| 6 | 1 | 1 | 1 | 1 | 1 | 1 | 1 | 1 |
| 7 | 0 | 1 | 0 | 0 | 0 | 1 | 1 | 0 |

Fig. 2c

| | 0 | 1 | 2 | 3 | 4 | 5 | 6 | 7 |
|---|---|---|---|---|---|---|---|---|
| 0 | 0 | 0 | 0 | 2 | 0 | 0 | 0 | 3 |
| 1 | 0 | 1 | 0 | 0 | 0 | 1 | 0 | 1 |
| 2 | 0 | 0 | 0 | 0 | 0 | 0 | 0 | 0 |
| 3 | 2 | 2 | 2 | 7 | 2 | 3 | 4 | 2 |
| 4 | 0 | 0 | 0 | 0 | 0 | 0 | 0 | 0 |
| 5 | 3 | 3 | 3 | 3 | 2 | 3 | 3 | 3 |
| 6 | 0 | 0 | 0 | 0 | 0 | 0 | 0 | 0 |
| 7 | 0 | 6 | 0 | 0 | 0 | 4 | 5 | 0 |

Fig. 2b

|      | BMP0 | BMP1 |
|------|------|------|
|      | 1    | 1    |
|      | 1    | 1    |
|      | 1    | 1    |
|      | 1    | 1    |
|      | 1    | 1    |
|      | 1    | 1    |
|      | 1    | 1    |
|      | 0    | 1    |

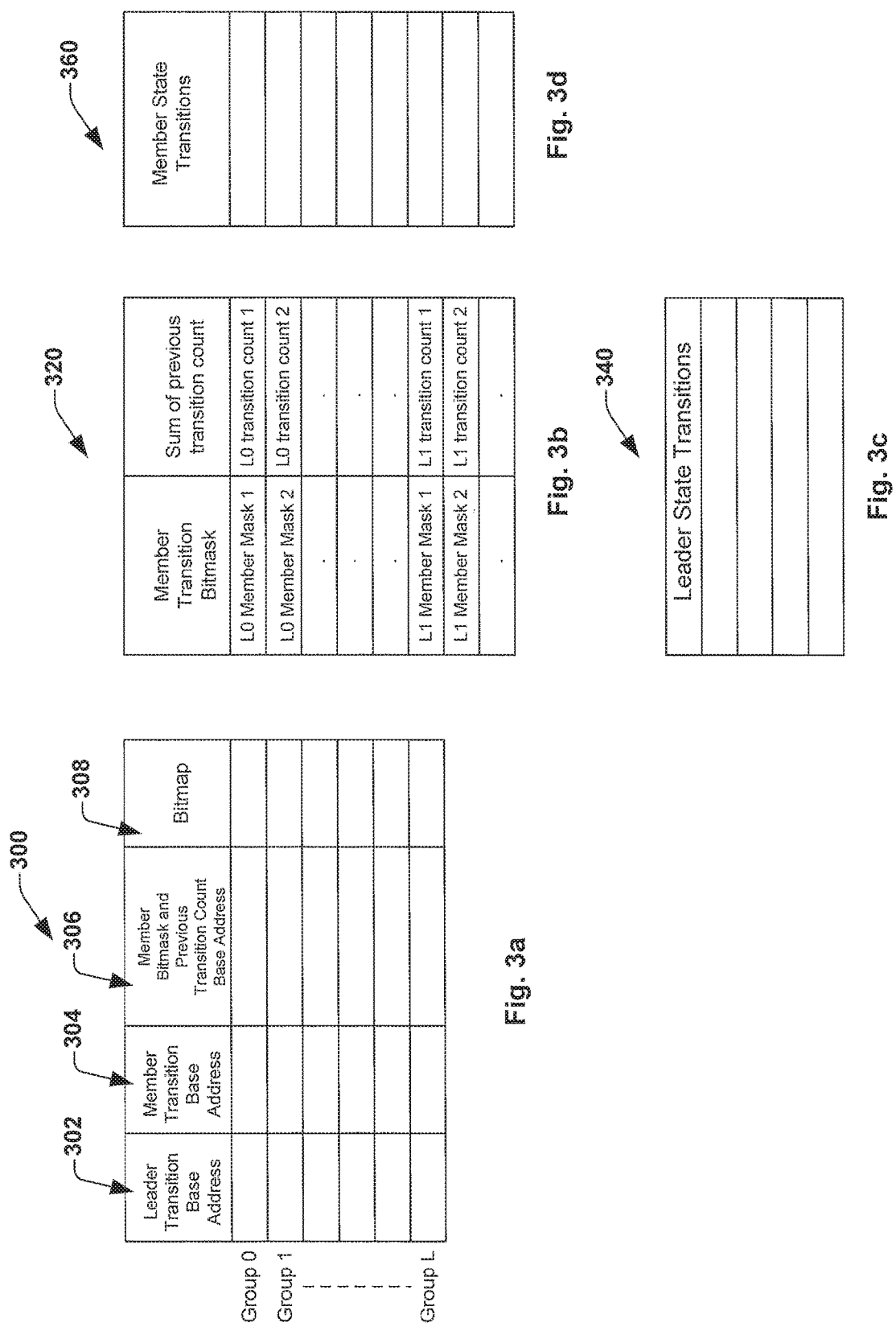

HARDWARE ACCELERATION ARCHITECTURE FOR SIGNATURE MATCHING APPLICATIONS FOR DEEP PACKET INSPECTION

FIELD

The present disclosure relates to deep packet inspection (DPI) methodologies in distributed network systems and in particular, to an architecture and a method that facilitates signature matching in DPI methodologies.

BACKGROUND

Modern networks are increasingly becoming content aware to improve data delivery and security via content-based network processing. Content-aware processing at the front end of distributed network systems include applications such as application identification for quality of service applications and deep packet inspection for various security application like anti malware. Deep packet inspection (DPI) methodologies are used to match transport layer data with a database of signatures, a predefined pattern that defines an attack. DPI methodologies inspect the payload portions of a data stream and use signatures to be matched along with specific header matches in the traffic stream. Matching signatures in a data stream is computationally a challenging task as the location of the signature could be anywhere in the incoming traffic stream.

In signature matching, the signatures are grouped into subgroups and the grouped signatures are combined to create a finite automaton which is understood by machines and the network traffic is compared with the automata to detect any attack in the network. Finite automata is differentiated into non-deterministic finite automata (NFA) and deterministic finite automata (DFA). Due to the flexibility and scalability of solutions, DFA based solutions are preferred for signature matching in case of deep packet inspection application. However, memory usage of DFAs can be prohibitively large.

BRIEF DESCRIPTION OF THE DRAWINGS

Some examples of circuits, apparatuses and/or methods will be described in the following by way of example only. In this context, reference will be made to the accompanying Figures.

FIG. 1a depicts a typical architecture of a distributed network system that facilitates deep packet inspection (DPI), according to one embodiment of the disclosure.

FIG. 1b depicts a hardware accelerator that facilitates deep packet inspection in distributed networks, according to one embodiment of the disclosure.

FIGS. 2a-2h depicts a compression technique based on bitmaps for a deterministic finite automaton (DFA), according to one embodiment of the disclosure.

FIGS. 3a-3d depicts the lookup tables in the memory circuit of a hardware accelerator in a signature matching hardware accelerator system, according to one embodiment of the disclosure.

DETAILED DESCRIPTION

Figure 1C:
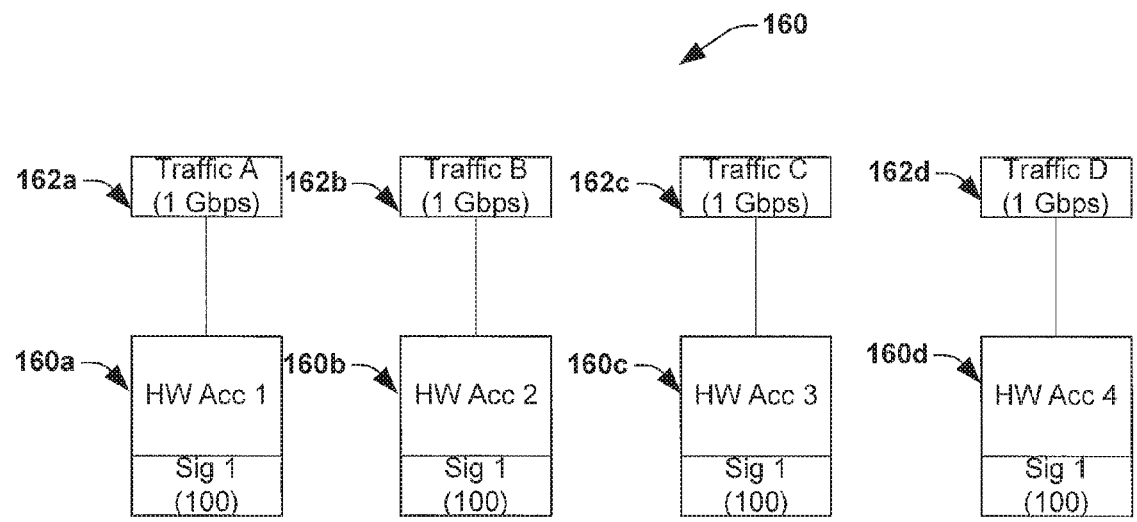
FIG. 1c comprises a signature matching hardware accelerator system comprising four hardware accelerator circuits, according to one embodiment of the disclosure.

In one embodiment of the disclosure, a signature matching hardware accelerator system comprising one or more hardware accelerator circuits is disclosed. Each of the hardware accelerator circuit utilizes a compressed deterministic finite automata (DFA) comprising a state table representing a database of digital signatures defined by a plurality of states and a plurality of characters, wherein the plurality of states are divided into groups based on bitmaps, each group comprising a leader state having a plurality of leader state transitions and one or more member states, each having a plurality of member state transitions is disclosed. The one or more hardware accelerator circuits comprises a memory circuit configured to store the leader state transitions within each group and only the member state transitions that are different from the leader state transitions for a respective character within each group. Further, the memory circuit is configured to store a plurality of member transition bitmasks associated respectively with the plurality of member state transitions, wherein the member transition bitmasks identify the member state transitions that are different from the leader state transitions for the respective character within each group.

In one embodiment of the disclosure, a method for compression of a deterministic finite automata (DFA) comprising a state table representing a database of digital signatures defined by a plurality of states and a plurality of characters, each of the plurality of states having a plurality of next state transitions associated therewith, in a processing circuit is disclosed. The method comprises grouping the plurality of states into one or more groups based on a bitmap of the respective states, each group comprising a leader state having a plurality of leader state transitions and one or more member states, each having a plurality of member state transitions. The method further comprises assigning a plurality of member transition bitmasks respectively to the plurality of member state transitions, wherein the member transition bitmasks identify the member state transitions that are different from the leader state transitions for a respective character.

In one embodiment of the disclosure, a method of fetching a next state transition from a compressed deterministic finite automata (DFA) using a processing circuit in a hardware accelerator circuit of signature matching hardware accelerator system, wherein the DFA comprises a state table representing a database of digital signatures defined by a plurality of states and a plurality of characters, wherein the plurality of states are divided into groups, each group comprising a leader state having a plurality of leader state transitions and one or more member states, each having a plurality of member state transitions and wherein each of the member state transitions is associated respectively with a plurality of member transition bitmasks that identify the member state transitions that are different from the leader state transitions for the respective character within each group is disclosed. The method comprises receiving information on a current state and a current input character and fetching the next state transition for the current state from a leader transition table comprising the plurality of leader state transitions within a memory circuit of the hardware accelerator circuit, when the current state is a leader state. The method further comprises fetching the next state transition for the current state selectively from the leader transition table or a member transition table within the memory circuit based on an information of the respective member transition bitmask, when the current state is a member state, wherein the member transition table comprises only the member state transitions of the plurality of member state transitions that are different from the leader state transitions for a respective character within each group.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processing circuit (e.g., a microprocessing circuit, a controller, or other processing device), a process running on a processing circuit, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processing circuits. The one or more processing circuits can be internal or external to the apparatus and can execute at least a part of the software or firmware application. As yet another example, a component can be an apparatus that provides specific functionality through electronic components without mechanical parts; the electronic components can include one or more processing circuits therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

As indicated above, DPI methodologies inspect the payload portions of an incoming data stream and use signatures to be matched along with specific header matches in the traffic stream. DPI methodologies inspect data packets at all layers from L2 to L7 of the open systems interconnection (OSI) model, including both the header and data portions of the data packet. In some embodiments, DPI methodologies include preprocessing of data, packet reordering, signature matching and data post processing. Out of this, signature matching is the most computationally challenging task as each incoming byte of the data stream has to be matched with a database of signatures and is often the bottleneck in achieving higher packet processing in distributed network systems. Further, DPI in network devices like routers has to be performed at wire-speed as the data stays in the device for a very short time and the data packets has to be forwarded to the destination quickly without clogging the device.

With the increasing bandwidth and low-latency requirements for DPI, hardware acceleration of signature matching is essential to provide better service to the end clients with DPI enabled in the system. Due to predictable and acceptable memory bandwidth requirements, deterministic finite automata (DFA) based solutions are generally preferred for signature matching in case of deep packet inspection applications. The DFA comprises a state table representing the database of digital signatures defined by a plurality of states and a plurality of characters and having a plurality of next state transitions for each state. However, the DFA requires a large memory to store the next state transitions. Therefore, for efficient hardware implementation of signature matching, the DFA has to be compressed.

There is a huge amount of redundancy in the DFA table, which is typically taken advantage of to efficiently store the data structures, for example, the DFA in memory. Previous solutions include DFA compression techniques that identified the DFA state transitions that are similar across multiple states and compressed the redundant transitions at the cost of memory bandwidth. Further, most of the previous solutions focused on software based implementations that achieve very high compression rates but at the cost of huge memory bandwidth where multiple states have to be fetched to calculate the correct next state transition. Huge memory bandwidth results in multiple memory lookups because of which high throughput DPI cannot be achieved.

Therefore, to overcome the disadvantages of the prior art, a hardware friendly implementation of the DFA compression technique is proposed in this disclosure. In particular, a method for DFA compression and a hardware acceleration architecture that facilitates signature matching for DPI is proposed. In one embodiment of the disclosure, a method of compression of a DFA that facilitates a hardware friendly implementation of the deep packet inspection is proposed. In another embodiment of the disclosure, a hardware acceleration architecture (e.g., a signature matching hardware acceleration system) that facilitates signature matching utilizing a compressed DFA is proposed. In some embodiments, the proposed DFA compression technique and the hardware acceleration architecture greatly reduces the memory requirements of the DFA, and also enables a faster and efficient lookup of the next state transitions from the compressed DFA stored in the memory. Further, the hardware acceleration architecture can be included in the existing packet processing data paths of the distributed network systems.

FIG. 1a depicts a typical architecture of a distributed network system 100 that facilitates deep packet inspection (DPI), according to one embodiments of the disclosure. In some embodiments, the distributed network system 100 can comprise host based systems, for example, a server or a client machine, and in other embodiments, the distributed network system 100 can comprise network based systems, for example, router. The distributed network system 100 comprises a front-end processor 102 and a back end processor 104. In some embodiments, the front-end processor 102 in the distributed network system 100 enables to perform deep packet inspection (DPI) of incoming network data in order to find, identify, classify, reroute or block data packets with specific data or code payloads. In some embodiments, the DPI methodologies are used to match transport layer data with a database of signatures, a predefined pattern that defines an attack.

In some embodiments, the front-end processor 102 comprises a first network interface circuit 106 configured to receive the network traffic, a network processor circuit 107 configured to process the incoming network traffic and a second network interface circuit 110 configured to forward the processed network traffic to the back-end processor 104 for further processing, based on the processing result at the network processor circuit 107. In some embodiments, the front-end processor 102 can have bi-directional data transfer, where data (i.e., network traffic) from the back-end processor 104 can further flow from the second network interface circuit 110 to the first network interface circuit 106. In such embodiments, the network processor circuit 107 is configured to process the data coming from both the directions. In some embodiments, the network processor circuit 107 comprises a signature matching hardware accelerator system 108 configured to store a database of signatures and compare the incoming network data with the database of signatures, in order to perform the DPI. In some embodiments, based on the result of the DPI, the front-end processor 102 comprising the network processor circuit 107 can take an informed decision on whether to forward the incoming data traffic to the back-end processor 104 for further processing or to be dropped. In some embodiments, the signature matching hardware accelerator system 108 is configured to match the incoming network traffic (e.g., transport layer data) with a deterministic finite automata (DFA) comprising a state table representing the database of signatures, in order to perform the deep packet inspection.

In some embodiments, the first network interface circuit 106 can comprise a plurality of network interfaces or ports, with data transfer between one or more network interfaces in the plurality of network interfaces. In some embodiments, the ports are capable of accepting and sending network traffic. In such embodiments, the network processor 107 comprising the signature matching hardware accelerator system 108 is configured to receive the network traffic from one of the ports of the first network interface circuit 106 and perform DPI on the received network traffic, before forwarding the network traffic to a subsequent port within the first network interface circuit 106 or second network interface circuit 110. In some embodiments, a decision whether to forward the network traffic or drop the network traffic is taken by the network processor 107, based on the result of the DPI. Similarly, in some embodiments, the second network interface circuit 110 can comprise a plurality of network interfaces or ports, with data transfer between one or more network interfaces in the plurality of network interfaces. In such embodiments, the network processor 107 comprising the signature matching hardware accelerator system 108 is configured to receive the network traffic from one of the ports of the second network interface circuit 110 and perform DPI on the received network traffic, before forwarding the network traffic to a subsequent port within the second network interface circuit 110 or the first network interface circuit 106.

In some embodiments, the signature matching hardware accelerator system 108 can comprise one or more hardware accelerator circuits (not shown), each having a DFA comprising a state table representing a database of signatures associated therewith. In some embodiments, the one or more hardware accelerator circuits can comprise DFAs with the same signature set. In such embodiments, multiple data streams can be inspected in parallel, thereby greatly increasing the throughput of DPI. An example implementation of this scenario is given in FIG. 1c. FIG. 1c comprises a a signature matching hardware accelerator system 160 comprising 4 hardware accelerator circuits 160a, 160b, 160c and 160d. Each of the hardware accelerator circuits 160a, 160b, 160c and 160d comprises 100 signatures storage capacity and 1 Gbps throughput capacity. In one scenario, if the target signature count is 100 and the target throughput is 4 Gbps, each of the 4 hardware accelerator circuits 160a, 160b, 160c and 160d can be configured to have the same signature set (or the same DFA) each having the target signature count of 100 and 4 data streams 162a, 162b, 162c and 162d can be inspected in parallel as shown in FIG. 1c. Therefore, in this embodiment, a throughput of 4 Gbps can be achieved.

Figure 1D:
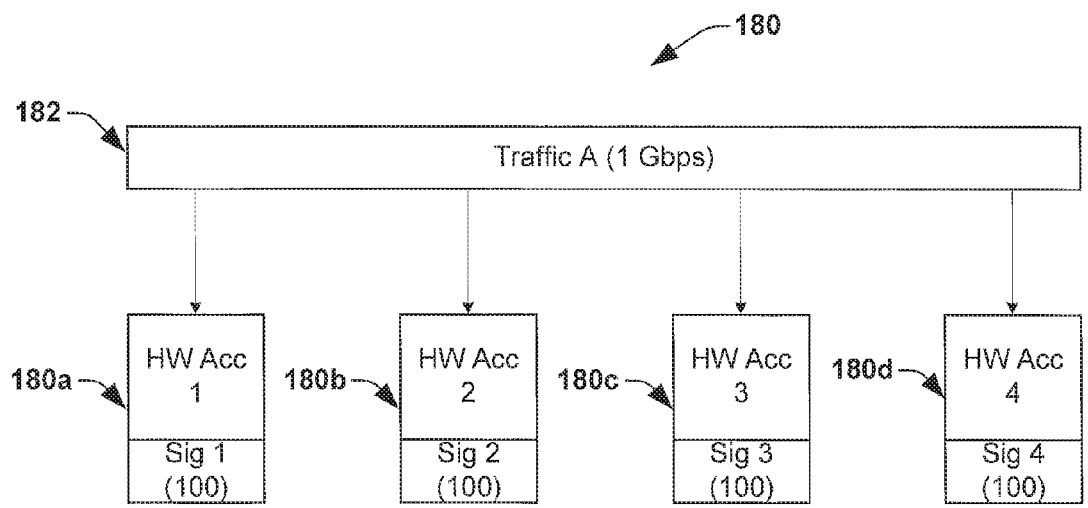
FIG. 1d comprises a signature matching hardware accelerator system comprising four hardware accelerator circuits, according to another embodiment of the disclosure.

Further, in other embodiments, the one or more hardware accelerator circuits can comprise DFAs with different signature sets. For example, in one instance, if due to some constraint the number of signatures in a signature set does not fit into one DFA (or a hardware accelerator circuit), then the signature set can split across multiple DFAs in multiple hardware accelerator circuits. An example implementation of this scenario is given in FIG. 1d. FIG. 1d comprises a a signature matching hardware accelerator system 180 comprising 4 hardware accelerator circuits 180a, 180b, 180c and 180d. Each of the hardware accelerator circuits 180a, 180b, 180c and 180d comprises 100 signatures storage capacity and 1 Gbps throughput capacity. In one scenario, if the target signature count is 400 and the target throughput is 1 Gbps, the target signature count of 400 can be divided between the 4 hardware accelerator circuits 180a, 180b, 180c and 180d, each having a signature count of 100. In such embodiments, the DFA associated with each of the 4 hardware accelerator circuits 180a, 180b, 180c and 180d are different, each having 100 signatures out of the 400 signature target count. In order to inspect a data stream 182 across the target signature count of 400 and have a throughput of 1 Gbps, in this embodiment, the same data stream 182 can be inspected across all the 4 hardware accelerator circuits 180a, 180b, 180c and 180d as shown in FIG. 1d. In another instance, for example, when the numbers of signatures in a signature set are less than the storage capacity of a hardware accelerator circuit, multiple groups of signatures can be used across multiple hardware accelerator circuits. Depending on the application scenarios, other combinations of the signature count and throughput is contemplated and is within the scope of this disclosure.

In some embodiments, the one or more hardware accelerator circuits can be selectively activated or deactivated based on the system requirements. In some embodiments, the DFA comprises a state table defined by a plurality of states and a plurality of characters, each state having a plurality of next state transitions associated respectively with the plurality of characters. In some embodiments, matching an incoming traffic with a DFA comprises fetching a next state transition from the DFA table, based on the information of a current state of the DFA and a current input character. In some embodiments, the current input character is derived from the incoming traffic and comprises a character in a sequence of characters in the incoming traffic to be matched with the DFA. In some embodiments, a match is determined when the next state transition fetched from the DFA table corresponding to the current state and the current input character is an accepting state. Accepting states are a subset of states in a DFA, which once reached, identifies that a signature has been successfully matched. Each accepting state has a unique identification associated with it to make sure that post processing rules corresponding to the signature are promptly followed.

FIG. 1b depicts a hardware accelerator circuit 150 that facilitates deep packet inspection in distributed networks, according to one embodiment of the disclosure. In some embodiments, the hardware accelerator circuit 150 is included within the signature matching hardware accelerator system 108 of FIG. 1a. In some embodiments, the hardware accelerator circuit 150 is configured to store a database of signatures and compare an incoming network data with the database of signatures in order to find, identify, classify, reroute or block data packets with specific data or code. In some embodiments, the hardware accelerator circuit 150 is configured to match the incoming network traffic (e.g., transport layer data) with a deterministic finite automata (DFA) comprising a state table representing the database of signatures. The hardware accelerator circuit 150 comprises a processing circuit 152 and a memory circuit 154. In some embodiments, the hardware accelerator circuit 150 is configured to operate in two phases: a compression phase and a fetch phase.

In the compression phase, the processing circuit 152 is configured to compress an original DFA table comprising a plurality of next state transitions is compressed to form the compressed DFA table. In some embodiments, the number of next state transitions in the compressed DFA table is less than the number of next state transitions in the original DFA table. In some embodiments, the original DFA table is compressed to form the compressed DFA table in order to reduce the memory requirement of the DFA and to enable an efficient lookup of the DFA table during deep packet inspection (DPI). In some embodiments, the original DFA table is compressed to form the compressed DFA table based on a predetermined compression technique, which is explained in detail in a subsequent embodiment described below. The memory circuit 154 is coupled to the processing circuit 152 and is configured to store the compressed DFA from the processing circuit 152. In some embodiments, the memory circuit can comprise a plurality of lookup tables configured to store the information related to the compressed DFA. In some embodiments, the compression phase is performed within the processing circuit 152 prior to the fetch phase. However, in other embodiments, the compression phase can be performed by a compression processing circuit (not shown) external to the hardware accelerator circuit 150 and stored in the memory circuit 154 prior to the fetch phase. In some embodiments, the compression processing circuit can be part of the network processor 107 in FIG. 1a, while in other embodiments, the compression processing circuit can be a separate chip external to the network processor 107.

In the fetch phase, the processing circuit 152 is configured to receive a current state and a current input character, and fetch the next state transition corresponding to the current state and the current input character from the compressed DFA stored in the memory circuit 154. In some embodiments, the next state transition for the current state is fetched by fetching information from one or more lookup tables in the memory circuit 154, in accordance with a predetermined algorithm, explained in detail in a subsequent embodiment below. In some embodiments, the fetch phase enables the signature matching system 150 to compare an incoming network data with the database of signatures to perform deep packet inspection.

Figures 2E, 2F, 2G, 2H:
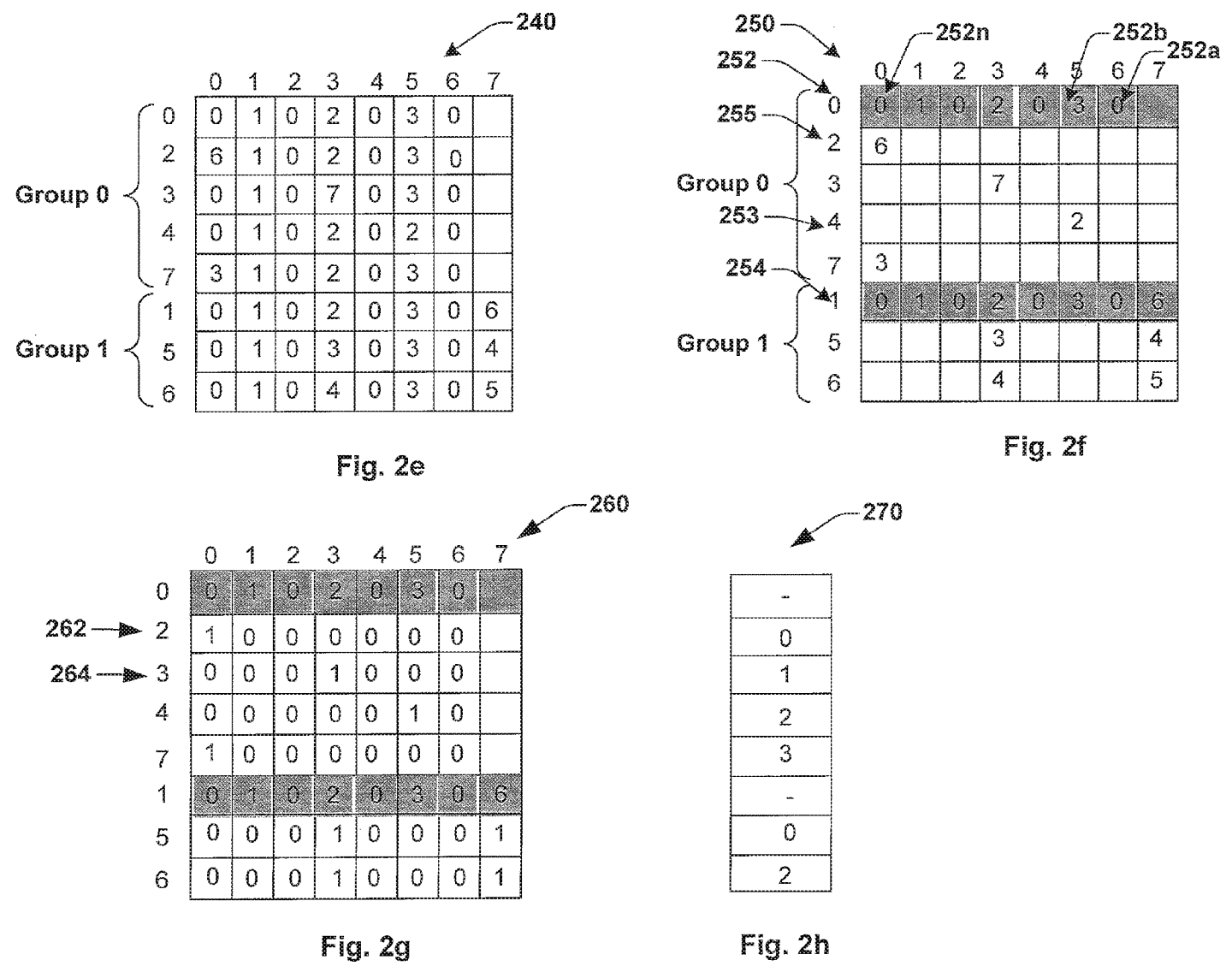

FIGS. 2a-2h depicts a compression technique based on bitmaps for a deterministic finite automata (DFA), according to one embodiment of the disclosure. In some embodiments, the compression technique discussed herein, can be utilized to determine the compressed DFA as indicated above with respect to FIG. 1b. In some embodiments, the compression technique discussed herein is performed within the processing circuit 152 in FIG. 1b and the compressed DFA is stored within the memory circuit 154 in FIG. 1b. However, in other embodiments, the compression technique is performed by a compression processing circuit external to the hardware accelerator circuit 150 in FIG. 1b and stored in the memory circuit 154 prior to the fetch phase. FIG. 2a depicts an original DFA table 200 comprising a state table representing a database of digital signatures. The DFA table 200 is defined by a plurality of states 202 and a plurality of characters 204. Each of the plurality of states 202 comprises a plurality of next state transitions corresponding to a plurality of characters. For example, the state 202a has a plurality of state transitions 203a, 203b etc. associated with the characters 204a, 204b etc. respectively.

FIG. 2b is derived from FIG. 2a by implementing an intra-state compression using bitmaps. For example, FIG. 2b comprises a derived DFA table 210 comprising a unique next state list, with each state having only next state transitions that are unique when compared to the DFA table 200 in FIG. 2a. A next state transition is unique if the next state transition for the current character is different from the next state transition of the previous character. For example, the next state transition 203b (i.e., 1) in FIG. 2a is unique as it is different from the previous next state transition 203c (i.e., 3). However, the next state transition 203a (i.e., 0) in FIG. 2a is not unique as it is same as the previous next state transition 203b (i.e., 0). Therefore, for the state 212a in FIG. 2b (corresponding to the state 202a in FIG. 2a), the derived DFA table 210 comprises only the unique next state transitions, for example, 203b, 203c and not 203a (not unique) in FIG. 2a.

FIG. 2c comprises the bitmap table 220 comprising the bitmaps assigned to each of the next state transitions in the FIG. 2a. In some embodiments, a bitmap of "1" is assigned to next state transitions that are unique, and a bitmap of "0" is assigned to next state transitions that are not unique. For example, for the state 212a (i.e., 0) in FIG. 2b, the next state transition 211a has a bitmap of "0" and the remaining next state transitions have a bitmap of "1". Therefore, the state 212a in FIG. 2b has an overall bitmap 222 in FIG. 2c, comprising a bitmap of "0" for the next state transition 211a and a bitmap of "1" for the remaining next state transitions. The bitmaps corresponding to the remaining states of the plurality of states 212 in FIG. 2b is derived in the same manner as indicated above.

FIG. 2d depicts an overall bitmap table 230 that comprises the overall bitmaps of the different states within the plurality of states 212, for example, BMP0 232 and BMP1 234. Once the overall bitmaps for the various states within the plurality of states 212 in FIG. 2b is determined, the plurality of states 212 are divided into different groups based on the overall bitmaps. In some embodiments, the states that share the same overall bitmap, are grouped together, for example, group 0 having the overall bitmap BMP0 232 and group 1 having the overall bitmap BMP1 234 as shown in FIG. 2e.

Once the plurality of states 212 are grouped as shown in FIG. 2e, within each group, a state is chosen as a leader state, while all other states are made member states as shown in FIG. 2f. For example, in FIG. 2f, within the group 0, the state 252 is chosen as the leader state, while all the other states are made the member states. Similarly, in the group 1, the state 254 is chosen as the leader state, while all the other states are made the member states. In other embodiments, however, any of the states within group 0 and group 1 can be chosen as their respective leader states. In some embodiments, the member states transitions, which are common with the leader state transitions for a particular character, are not stored in the memory circuit, for example, the memory circuit 154 as indicated above with respect to FIG. 1b, thereby compressing the DFA table to form the compressed DFA table 250. For example, only the member state transitions "6", "7", "2" and "3" in the group 0 and the member state transitions "3", "4", "4" and "5" in the group 1 are stored in the memory circuit. In some embodiments, a threshold of X % is set to compare the transitions of member state with the leader state. If the percentage of transitions, which are different between the leader and the member, is greater than X, a new leader state is created and states are regrouped so that there is best fit for each member into a corresponding leader state.

Once the leader state and the member states within each group are chosen, a member transition bitmask is assigned to each of the member states within each group. In some embodiments, the member transition bitmask comprises a plurality of bitmasks assigned respectively to the plurality of member state transitions of a member state, wherein the bitmasks identify the member state transitions that are different from the leader state transitions for the respective character within each group as shown in FIG. 2g. In some embodiments, the member state transitions, which are different from the leader state transitions for a corresponding character, will have a bitmask of "1", while the member state transitions, which are same as the leader state transitions for a corresponding character, will have a bitmask of "0". For example, the member state transitions "6", "7", "2" and "3" in the group 0 and the member state transitions "3", "4", "4" and "5" in the group 1 (as indicated in FIG. 2f) are assigned a bitmask of "1", while all the other member state transitions are assigned a bitmask of "0".

Once the member transition bitmasks are assigned for each of the member states as shown in FIG. 2g, a sum of the member state transitions that are different from their respective leader state transitions, that is, a previous transition count (for example, a sum of the member state transitions with a bitmask of "1") prior to a current state, are computed per member state within each group, as shown in table 270 in FIG. 2h. For example, in FIG. 2g, the sum of the member state transitions with a bitmask of "1" prior to the member state 262 is 0 and the sum of the member state transitions with a bitmask of "1" prior to the member state 264 is 1. In some embodiments, information on the compressed DFA table, for example, the overall bitmaps of the group 0 and the group 1, the leader state transitions of the group 0 and the group 1, the member state transitions of the group 0 and the group 1, the bitmasks of each of the member state and the previous transition count are stored in the memory circuit, for example, the memory circuit 154 of FIG. 1b.

FIGS. 3a-3d depicts the lookup tables in the memory circuit of a hardware accelerator circuit in a signature matching hardware accelerator system, according to one embodiment of the disclosure. In some embodiments, the lookup tables are included within the memory circuit 154 in FIG. 1. In some embodiments, the lookup tables are configured to store information on a compressed DFA table, for example, the compressed DFA table 250 derived based on the compression technique explained in FIGS. 2a-2h above. In this embodiment, the information stored in the lookup tables 300, 320, 340 and 360 are explained with reference to the DFA compression technique explained in FIGS. 2a-2h above. In some embodiments, the different states in a compressed DFA table are identified by a combination of group ID and member ID. In some embodiments, the group ID refers to the group having the same overall bitmap within the compressed DFA table, for example, a group ID of 0 for group 0 and a group ID of 1 for group 1 in FIG. 2f. In some embodiments, the member ID represents the unique member state in a group, for example, a member ID of 1 for the member state 255 and a member ID of 3 for the member state 254. By default the member ID of the leader state is always 0. In some embodiments, the lookup tables 300, 320, 340 and 360 comprises different locations of a memory circuit, however, in other embodiments, the lookup tables 300, 320, 340 and 360 can be part of different memory circuits.

FIG. 3a comprises an address mapping table 300, FIG. 3b comprises a member bitmask table 320, FIG. 3c comprises a leader transition table 340 and FIG. 3d comprises a member transition table 360. The leader transition table 340 in FIG. 3c is configured to store the leader transitions within each group of a compressed DFA table. For example, in some embodiments, the leader transition table 340 is configured to store the leader transitions, for example, 252a, 252b . . . 252n associated with the leader state 252 and the leader transitions, for example, 254a, 254b . . . 254n associated with the leader state 254 in the compressed DFA table 250 in FIG. 2f.

The member transition table 360 in FIG. 3d is configured to store only the member state transitions that are different from the leader state transitions for a respective character within each group. For example, in some embodiments, the member transition table 360 is configured to store the member state transitions "6", "7", "2" and "3" in the group 0 and the member state transitions "3", "4", "4" and "5" in the group 1 in the compressed DFA table 250 in FIG. 2f. The member bitmask table 320 in FIG. 3b is configured to store the member transition bitmasks associated with each of the member states within each group, for example, 1000000 for the member state 262 and 0001000 for the member state 264. The member bitmask table 320 in FIG. 3b is further configured to store a previous transition count that indicates a count of the member state transitions that are different from the corresponding leader state transitions, before the respective member state in each group. For example, in some embodiments, the member bitmask table 320 is configured to store the previous transition count in the table 270 in FIG. 2h.

The address mapping table 300 in FIG. 3a is configured to store the start address of the first leader state transition, i.e., the leader transition base address, within each group stored in the leader transition table 340 (for example, in column 302 of the table 300) and the start address of the first member state transition within each group, i.e., the member transition base address, stored in the member transition table 360 (for example, in column 304 of the table 300). In some embodiments, the address mapping table 300 is further configured to store the start address of the member bitmask and the previous transition count within each group, i.e., the member bitmask and the previous transition count base address, stored in the member bitmask table 320 (for example, in column 306 of the table 300). Furthermore, in some embodiments, the address mapping table 300 is configured to store the overall bitmap of each group of the compressed DFA table, (for example, in column 308).

Figure 4:
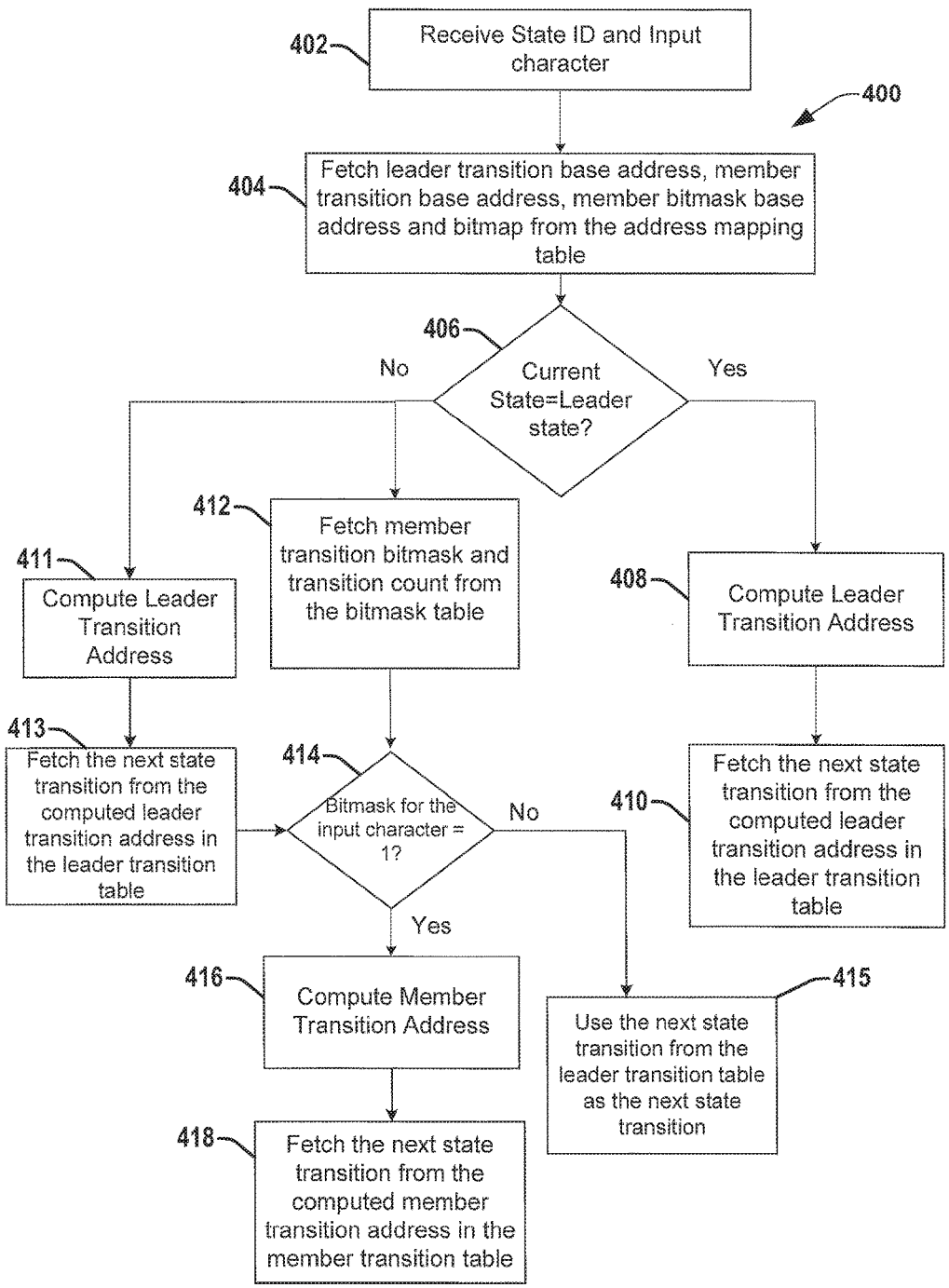
FIG. 4 depicts a flowchart of an algorithm for fetching a next state transition from a compressed deterministic finite automaton (DFA) in a hardware accelerator of a signature matching hardware accelerator system, according to one embodiment of the disclosure.

FIG. 4 depicts a flowchart of an algorithm 400 for fetching a next state transition from a compressed deterministic finite automata (DFA) in a hardware accelerator circuit of a signature matching hardware accelerator system, according to one embodiment of the disclosure. The algorithm 400 is described herein with reference to the hardware accelerator 150 in FIG. 1b and the lookup tables in FIGS. 3a-3d. In some embodiments, the algorithm 400 is performed within the processing circuit 152 of the hardware accelerator 150, in order to fetch a next state transition from a compressed DFA stored within the memory circuit 154 in FIG. 1b. At 402, a state ID that identifies a current state of the compressed DFA and an input character that defines an incoming data to be matched is received at the processing circuit 152. In some embodiments, the state ID comprises information on a group ID that identifies the group in the compressed DFA table to which the current state belongs and a member ID that identifies the unique member state (i.e., the current state) within the group.

At 404, a leader transition base address, a member transition base address, a member bitmask base address and an overall bitmap is fetched by the processing circuit 152 from the address mapping table 300 (within the memory circuit 154), based on the information of the group ID. At 406, a determination whether the current state is a leader state is performed at the processing circuit 152 based on the member ID. If yes, the method proceeds to 408, and if No, the method proceeds to 412. In some embodiments, if the member ID associated with the current state is 0, then the current state is a leader state and if the member ID associated with the current state is non-zero, then the current state is a member state. At 408, a leader transition address associated with the current state is computed at the processing circuit 152.

In some embodiments, the leader transition address identifies a location of a next state transition associated with the current input state and the input character in the leader transition table 340. In some embodiments, the leader transition address is computed as given below:

$$\text{Leader transition address} = \text{leader transition base address} + \text{Leader Offset} \quad (1)$$

Where leader transition base address is obtained from the address mapping table 300 at 404 above and leader offset is computed based on the corresponding overall bitmap obtained from the address mapping table 300 at 404 above. For example, if the bitmap corresponding to the current input character is "1", then the leader offset=the number of 1's in the overall bitmask before the current character. Further, if the bitmap corresponding to the current input character is "0", then the leader offset is equal to the number of 1's in the overall bitmask before the current character −1. At 410, the next state transition at the location of the computed leader transition address is fetched from the leader transition table 340, by the processing circuit 152.

In some embodiments, if the current state is a leader state, then fetching the next state transition is completed in 2 clock cycles. For example, in a first clock cycle, the leader transition base address, the member transition base address, the member bitmask base address and the overall bitmap are fetched from the address mapping table 300 (as given in 404 above), and in a second clock cycle, the leader transition address is computed and the next state transition is fetched from the computed leader transition address in the leader transition table 340 (as given in 410 above). If the current state is a member state at 406, the method proceeds to 412 and 411. At 412, a member transition bitmask and a previous transition count for the member state are fetched from the bitmask table 320 by the processing circuit 152. In some embodiments, the address of the member transition bitmask is computed as given below:

$$\text{Address of Member transition bitmask} = \text{member bitmask base address} + \text{member ID} - 1 \quad (2)$$

At 411, the leader transition address corresponding to the current input character is computed as given above in equation (1). At 413, the next state transition at the location of the computed leader transition address is fetched from the leader transition table 340, by the processing circuit 152. At 414, a determination whether the bitmask corresponding to the current input character in the member transition bitmask is equal to "1" is performed at the processing circuit 152. If yes, the method proceeds to 416, else the method proceeds to 415, where the next state transition fetched from the leader transition table 340 at 413 above is used as the next state transition. In some embodiments, a bitmask of "1" indicates that the member state transition associated with the member is different from the leader state transition for the corresponding input character. In such embodiments, the next state transition associated with the member state is fetched from one or more member state transitions stored in the member transition table 360. A bitmask of "0" indicates that the member state transition associated with the member state is same as the leader state transition for the corresponding input character. In such embodiments, the next state transition associated with the member state is fetched from one or more leader state transitions stored in the leader transition table 340.

At 416, a member transition address associated with the current state is computed at the processing circuit 152. In some embodiments, the member transition address identifies a location of the next state transition associated with the current input state and the input character in the member transition table 360. In some embodiments, the member transition address is computed as given below:

Member transition address=member transition base address+previous transition count for the current state+member offset (3)

Where the member transition base address is obtained from the address mapping table 300 at 404 above, the previous transition count is obtained from the bitmask table 320 at 412 above and the member offset=number of 1's in the member transition bitmask before the current input character.

At 418, the next state transition at the location of the computed member transition address is fetched from the member transition table 360, by the processing circuit 152. In some embodiments, if the current state is a member state, then fetching the next state transition is completed in 2 or 3 clock cycles. For example, in a first clock cycle, the leader transition base address, the member transition base address, the member bitmask base address and the overall bitmap are fetched from the address mapping table 300 as given in 404 above. In a second clock cycle, the member transition bitmask and the previous transition count for the member state are fetched from the bitmask table 320 as given in 412 above, and the leader transition address is computed and the next state transition is fetched from the leader transition table 340 as given in 413 above. If the bitmask for the current input character is 0, the next state transition fetched during 413 above is used as the next state transition. In such embodiments, fetching the next state transition is completed in 2 clock cycles. Alternately, if the bitmask for the current input character is 1, the member transition address associated with the current state is computed and the next state transition is fetched from the computed member transition address in the member transition table 360 as given in 418 above, in a third clock cycle. In such embodiments, fetching the next state transition is completed in 3 clock cycles.

Figure 5:
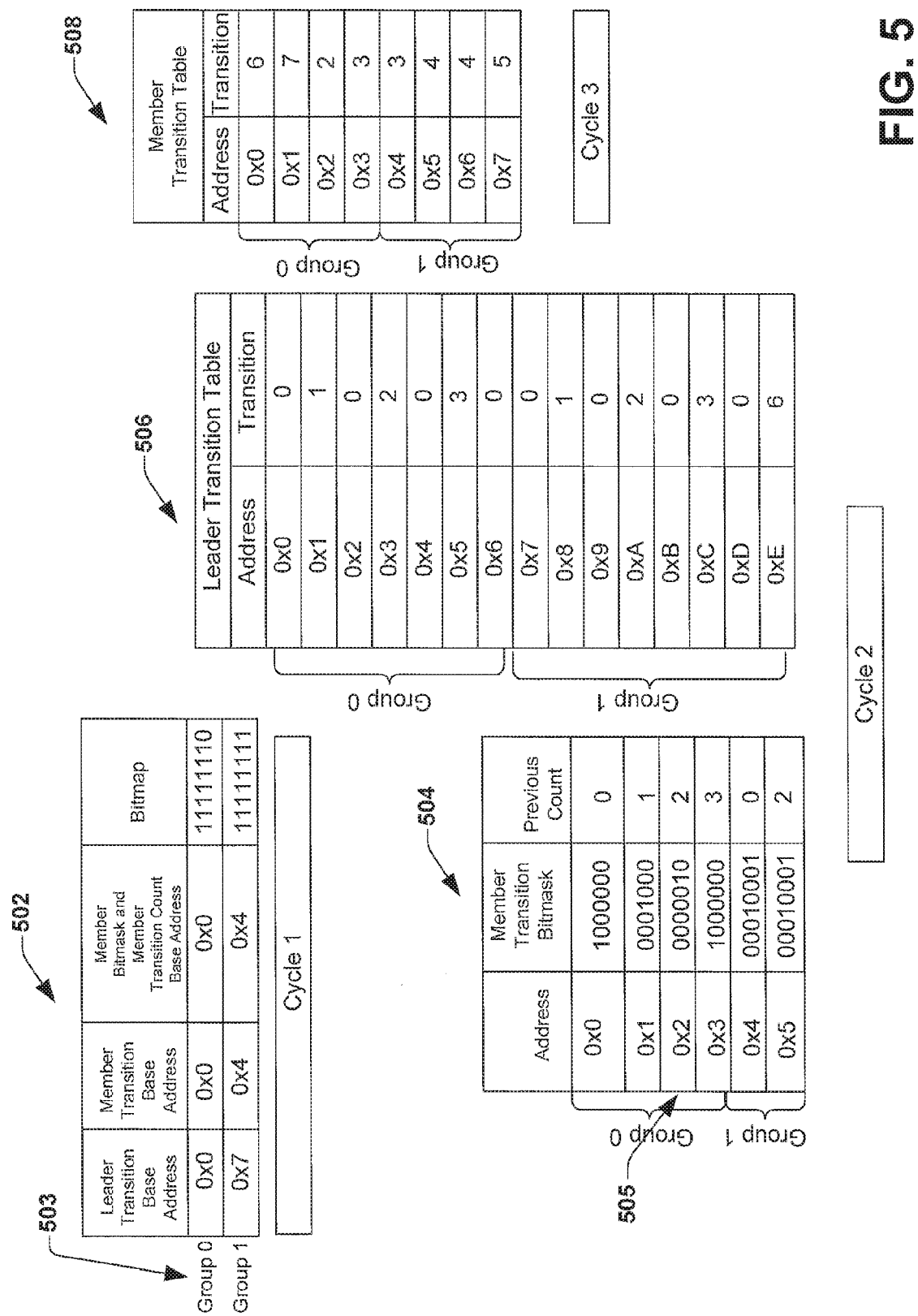
FIG. 5 depicts an example implementation of a plurality of lookup tables in a memory circuit of a hardware accelerator that enables to fetch a next state transition for a current state and an input character, according to one embodiment of the disclosure.

FIG. 5 depicts an example implementation of a plurality of lookup tables 502, 504, 506 and 508 in a memory circuit of a hardware accelerator that enables to fetch a next state transition for a current state and an input character, according to one embodiment of the disclosure. In some embodiments, the plurality of lookup tables 502, 504, 506 and 508 are included within the memory circuit 154 of the hardware accelerator 150 of FIG. 1b. In some embodiments, the information in the plurality of lookup tables 502, 504, 506 and 508 are populated from a compressed DFA representing a database of digital signatures. In some embodiments, information on a next state transition is fetched from the plurality of lookup tables, based on the information of a current state and a current input character by a processing circuit of the hardware accelerator (for example, the processing circuit 152 of the hardware accelerator 150). In this embodiment, the plurality of lookup tables is explained with reference to the compressed DFA table 250 in FIG. 2f.

The lookup table 506 comprises the leader transition table and comprises the leader state transitions of the compressed DFA table 250 at a plurality of locations defined by a respective leader transition address. For example, the first leader state transition "0" in group 0 of the DFA table 250 is located at the address "0x0" in the leader transition table 506 and the second leader state transition "1" in group 0 of the DFA table 250 is located at the address "0x1" in the leader transition table 506. The lookup table 508 comprises the member transition table and comprises the unique member state transitions of the compressed DFA table 250 at a plurality of locations defined by a respective member transition address. For example, the first unique member state transition "6" in group 0 of the DFA table 250 is located at the address "0x0" in the member transition table 508 and the second unique member state transition "7" in group 0 of the DFA table 250 is located at the address "0x1" in the member transition table 508. In some embodiments, the unique member state transitions corresponds to the member state transitions that are different from the leader state transitions for a respective character within each group.

The lookup table 504 comprises the bitmask table and comprises the member transition bitmasks and the previous transition count of the plurality of member states within each group of the compressed DFA table 250, at a plurality of locations defined by a respective bitmask address. For example, the member transition bitmask of the first member state (for example, 262 in FIG. 2g) is stored at the address "0x0" in the bitmask table 504 and the member transition bitmask of the second member state (for example, 264 in FIG. 2g) is stored at the address "0x1" in the bitmask table 504. The lookup table 502 comprises the address mapping table and comprises the leader transition base address of each group from the leader transition table 506 (for example, 0x0 for group 0) and the member transition base address of each group from the member transition table 508 (for example, 0x0 for group 0). The lookup table 502 further comprises the member bitmask base address of each group from the bitmask table 504 (for example, 0x0 for group 0), and the overall bitmaps for each group (for example, 11111110 for group 0) of the DFA table 250.

In some embodiments, information on a next state transition is fetched from the plurality of lookup tables, based on the information of a current state and a current input character, in accordance with the algorithm 400 of FIG. 4 above. For example, with reference to the compressed DFA table 250 in FIG. 2f, a state ID (0, 3), where 0 is the group ID and 3 is the member ID corresponds to the member state 253. For a current input state defined by a state ID (0, 3), and a current input character 5, the next state transition is 2 as can be seen from the compressed DFA table 250. In order to fetch the next state transition "2" from the plurality of lookup tables, the algorithm 400 is implemented. As per the algorithm, the processing circuit (for example, the processing circuit 152 in FIG. 1b) is configured to fetch the leader transition base address, the member transition base address, the member bitmask base address and the overall bitmap corresponding to group 0 from the address mapping table 502 in the first clock cycle. Subsequently, a determination whether the current state is a leader state is performed. The current state (0,3) is a member state since the member ID is non-zero. Since the current state is a member state, the processing circuit is configured to fetch the member transition bitmask (i.e., 0000010) and the previous transition count (i.e., 2) from the bitmask address 505 (i.e., 0x2) for the member state (0,3) from the bitmask table 504 in the second clock cycle. The address of the member transition bitmask is computed based on equation (2) above. For example, member transition bitmask address=(0x0)+(0x3)−1=(0x2).

Since the bitmask corresponding to the input character "5" in the bitmask 505 is 1, the next state transition corresponding to the member state (0,3) is fetched from the member transition table 508 by computing the member transition address based on equation (3) above in the third clock cycle. For example, member transition address=(0x0)+2+0=(0x2), where the member transition base address=(0x0), previous transition count=2 and number of 1's in the member transition bitmask prior to the current input character=0. The member state transition at the member transition address 0x2 is 2.

Figure 6:
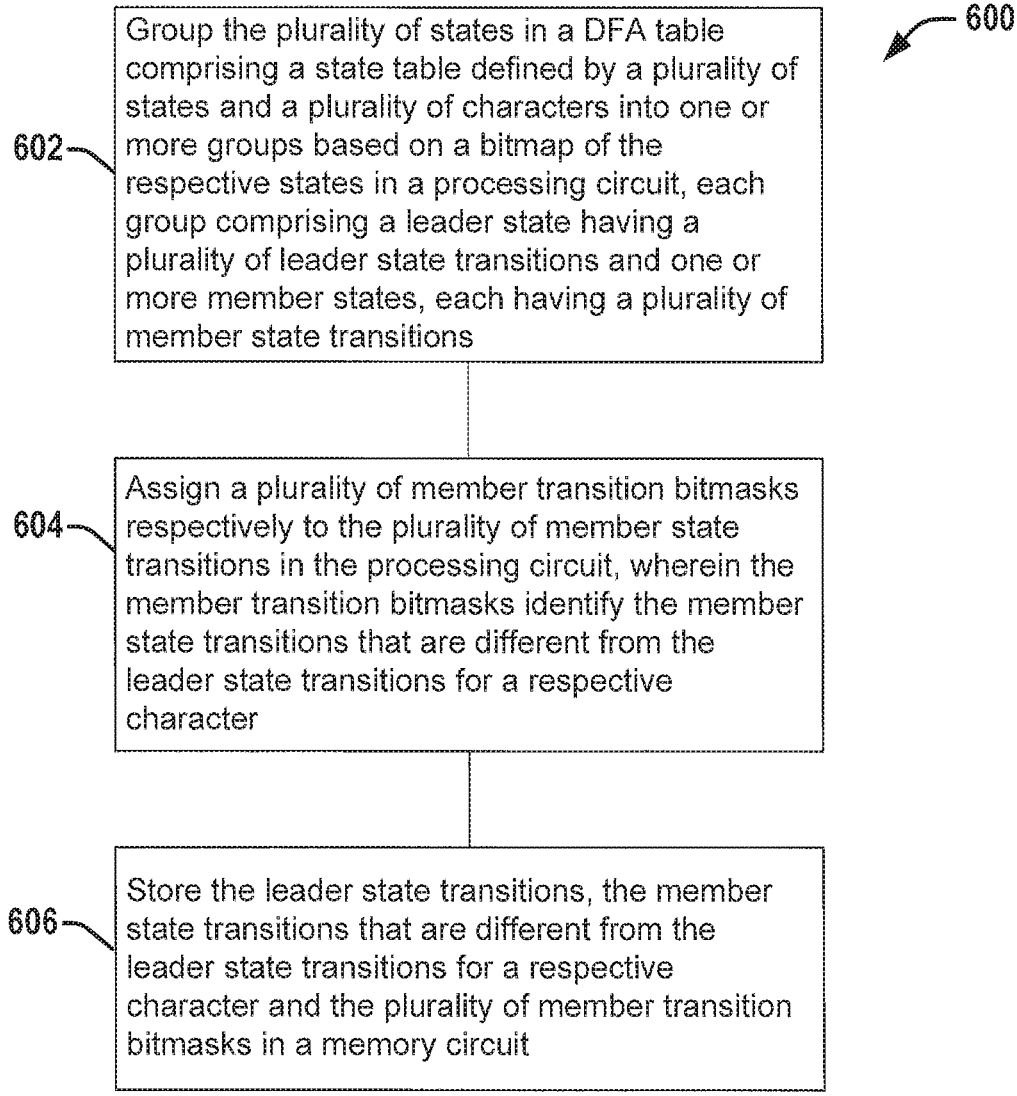
FIG. 6 illustrates a flowchart of a method for compression of a deterministic finite automaton (DFA) to form a compressed DFA, according to one embodiment of the disclosure.

FIG. 6 illustrates a flowchart of a method 600 for compression of a deterministic finite automaton (DFA) to form a compressed DFA, according to one embodiment of the disclosure. The method 600 is described herein with reference to the hardware accelerator circuit 150 in FIG. 1b and the DFA tables in FIGS. 2a-2h. However, in other embodiments, the method 600 can be performed in a processing circuit external to the hardware accelerator circuit 150 in FIG. 1b or external to the network processor 107 in FIG. 1a. In some embodiments, the method 600 can be implemented in a processing circuit external to the distributed network system 100 in FIG. 1a and the resultant compressed DFA is stored in a memory circuit within the network processor 107 in FIG. 1a.. At 602, a plurality of states in a DFA table comprising a state table defined by a plurality of states and a plurality of characters is grouped into one or more groups, based on a overall bitmap of the respective states in the processing circuit 152, each group comprising a leader state having a plurality of leader state transitions and one or more member states, each having a plurality of member state transitions. In some embodiments, the plurality of states in the DFA table is grouped in accordance with the procedure explained above with respect to FIGS. 2a-2f.

At 604, a plurality of member transition bitmasks is assigned respectively to the plurality of member state transitions in the processing circuit 152, wherein the member transition bitmasks identify the member state transitions that are different from the leader state transitions for a respective character. In some embodiments, the plurality of member transition bitmasks is assigned in accordance with the procedure explained above with respect to FIG. 2g. At 606, the leader state transitions, the member state transitions that are different from the leader state transitions for a respective character and the plurality of member transition bitmasks are stored in the memory circuit 154, using the processing circuit 152. In some embodiments, the memory circuit 154 comprises a plurality of lookup tables to store the leader state transitions, the member state transitions that are different from the leader state transitions for a respective character and the plurality of member transition bitmasks, as explained above with respect to FIGS. 3a-3d.

Figure 7:
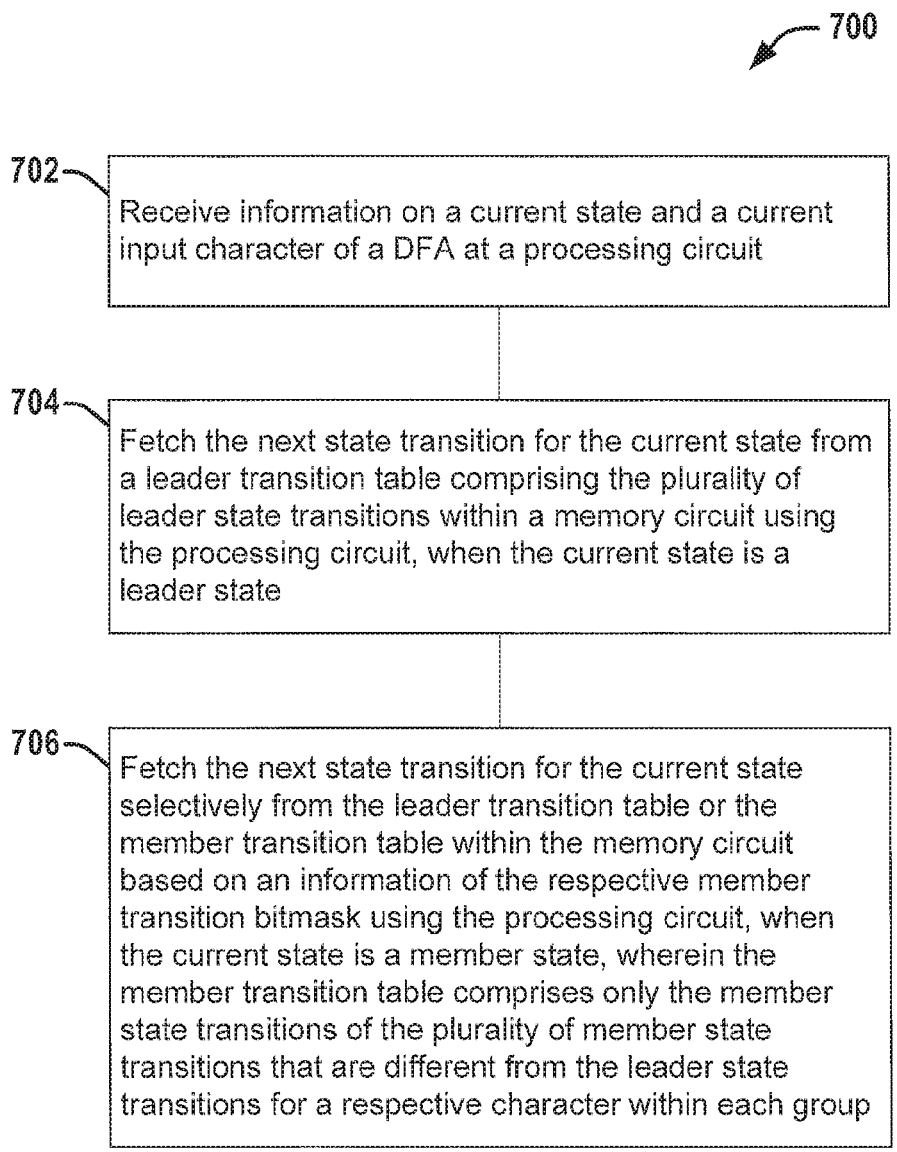
FIG. 7 illustrates a flowchart of a method for fetching a next state transition from a compressed deterministic finite automaton (DFA) in signature matching hardware accelerator system, according to one embodiment of the disclosure.

FIG. 7 illustrates a flowchart of a method 700 for fetching a next state transition from a compressed deterministic finite automaton (DFA) in signature matching hardware accelerator system, according to one embodiment of the disclosure. In some embodiments, the method 700 can be implemented within the processing circuit 152 of the hardware accelerator circuit 150 in FIG. 1b. At 702, information on a current state and a current input character of a DFA is received at the processing circuit 152. In some embodiments, the current input character defines the incoming data traffic to be compared with the DFA, as explained above with reference to FIG. 1a.

At 704, the next state transition for the current state is fetched from a leader transition table within the memory circuit 154 using the processing circuit 152, when the current state is a leader state. In some embodiments, the next state transition is fetched from a leader transition table in accordance with the algorithm 400 explained above in FIG. 4. At 706, the next state transition for the current state is fetched selectively from the leader transition table or the member transition table within the memory circuit 154, based on an information of the respective member transition bitmask, when the current state is a member state. In some embodiments, the next state transition is fetched selectively from the leader transition table or the member transition table, in accordance with the algorithm 400 explained above in FIG. 4.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a hardware accelerator system for signature matching in a distributed network system comprising one or more hardware accelerator circuits, wherein each of the hardware accelerator circuit utilizes a compressed deterministic finite automata (DFA) comprising a state table representing a database of digital signatures defined by a plurality of states and a plurality of characters, wherein the plurality of states are divided into groups, each group comprising a leader state having a plurality of leader state transitions and one or more member states, each having a plurality of member state transitions, the one or more hardware accelerators comprising, a memory circuit configured to store the leader state transitions within each group of the compressed DFA; only the member state transitions that are different from the leader state transitions for a respective character within each group of the compressed DFA; and member transition bitmasks associated respectively with the one or more member states, wherein each of the member transition bitmasks comprises a plurality of bitmasks that identify the member state transitions within the respective member state that are different from the leader state transitions for a respective character within each group of the compressed DFA.

Example 2 is system including the subject matter of example 1, wherein the one or more hardware accelerator circuits further comprises a processing circuit configured to fetch a next state transition from the leader state transitions or the member state transitions in the memory circuit, based on the information of a current state, a current input character and, when the current state is a member state, the member transition bitmask.

Example 3 is system including the subject matter of examples 1-2, including or omitting elements, wherein the processing circuit is further configured to receive the current state and the current input character prior to fetching the next state transition.

Example 4 is system including the subject matter of examples 1-3, including or omitting elements, wherein the current state is defined by a group ID that identifies the group in the compressed DFA to which the current state belongs and a member ID that identifies if the current state is a leader state or a member state.

Example 5 is system including the subject matter of examples 1-4, including or omitting elements, wherein the memory circuit comprises a leader transition table configured to store the leader transitions within each group of the compressed DFA and a member transition table configured to store the member state transitions that are different from the leader state transitions for a respective character within each group of the compressed DFA.

Example 6 is system including the subject matter of examples 1-5, including or omitting elements, wherein the memory circuit further comprises a member bitmask table configured to store the plurality of member transition bitmasks associated with the one or more member states within each group and a previous transition count that indicates a count of the member state transitions that are different from the corresponding leader state transitions, before the respective member state in each group.

Example 7 is system including the subject matter of examples 1-6, including or omitting elements, wherein the memory circuit further comprises an address mapping table configured to store a leader transition base address of each group within the leader transition table; a member transition base address of each group within the member transition table; member transition bitmask and previous transition count base address of each group within the member bitmask table; and a bitmap of each group.

Example 8 is system including the subject matter of examples 1-7, including or omitting elements, wherein the processing circuit is configured to fetch the next state transition from the leader transition table when the current state is a leader state, or when the current state is a member state and the member transition bitmask from the member bitmask table for the respective member state indicates that a member state transition of the respective member state and a leader state transition for the current input character are the same.

Example 9 is system including the subject matter of examples 1-8, including or omitting elements, wherein the processing circuit is further configured to determine a leader transition address that indicates the address of the next state transition in the leader state table based on the leader transition base address and the bitmap from the address mapping table, prior to fetching the next state transition from the leader transition table.

Example 9 is system including the subject matter of examples 1-8, including or omitting elements, wherein the processing circuit is further configured to determine a leader transition address that indicates the address of the next state transition in the leader state table based on the leader transition base address and the bitmap from the address mapping table, prior to fetching the next state transition from the leader transition table.

Example 10 is system including the subject matter of examples 1-8, including or omitting elements, wherein the processing circuit is configured to fetch the next state transition from the member transition table, when the current state is a member state and the member transition bitmask from the member bitmask table for the respective member state indicates that a member state transition of the respective member state and a leader state transition for the current input character are different.

Example 11 is system including the subject matter of examples 1-10, including or omitting elements, wherein the processing circuit is further configured to determine a member transition address that indicates the address of the next state transition in the member state table based on the member transition base address and the previous transition count from the address mapping table, and a count of the bitmasks of member state transitions that are different from the corresponding leader state transitions for the current state before the current input character, prior to fetching the next state transition from the member transition table.

Example 12 is system including the subject matter of examples 1-11, including or omitting elements, wherein the DFA associated with the one or more hardware accelerator circuits are the same.

Example 13 is system including the subject matter of examples 1-12, including or omitting elements, wherein the DFA associated with the one or more hardware accelerator circuits is different.

Example 14 is system including the subject matter of examples 1-13, including or omitting elements, wherein a plurality of signatures associated with an application is split between the DFA associated with the one or more hardware accelerator circuits.

Example 15 is system including the subject matter of examples 1-14, including or omitting elements, wherein the one or more hardware accelerators are selectively activated based on the system requirements.

Example 16 is method for compression of a deterministic finite automata (DFA) comprising a state table representing a database of digital signatures defined by a plurality of states and a plurality of characters, each of the plurality of states having a plurality of next state transitions associated therewith, in a processing circuit, comprising grouping the plurality of states into one or more groups based on a bitmap of the respective states, each group comprising a leader state having a plurality of leader state transitions and one or more member states, each having a plurality of member state transitions; and assigning member transition bitmasks respectively to the one or more member states within each group, wherein the member transition bitmasks comprises a plurality of bitmasks that identify the member state transitions within the respective member state that are different from the leader state transitions for a respective character.

Example 17 is a method including the subject matter of example 16, further comprising storing the leader state transitions, the member state transitions that are different from the leader state transitions for the respective character and the plurality of member transition bitmasks in a memory circuit.

Example 18 is a method including the subject matter of examples 16-17, including or omitting elements, further comprising assigning a plurality of bitmaps respectively to the plurality of state transitions within each of the plurality of states of the DFA, forming an overall bitmap for each of the plurality of states, prior to grouping the plurality of states.

Example 19 is a method including the subject matter of examples 16-18, including or omitting elements, wherein grouping the plurality of states comprises dividing the plurality of states into one or more groups, wherein each of the plurality of states within each group have the same overall bitmap.

Example 20 is a method including the subject matter of examples 16-19, including or omitting elements, wherein assigning the member transition bitmask comprises assigning a first bitmask to the member state transitions that are different from the leader state transitions for the respective character, and assigning a second, different bitmask to the member state transitions that are same as the leader state transitions for the respective character.

Example 21 is a method for fetching a next state transition from a compressed deterministic finite automata (DFA) using a processing circuit in a hardware accelerator circuit of signature matching hardware accelerator system, wherein the DFA comprises a state table representing a database of digital signatures defined by a plurality of states and a plurality of characters, wherein the plurality of states are divided into groups, each group comprising a leader state having a plurality of leader state transitions and one or more member states, each having a plurality of member state transitions and wherein each of the member state is associated a member transition bitmask comprising a plurality of bitmasks that identify the member state transitions within the respective member state that are different from the leader state transitions for the respective character, comprising receiving information on a current state and a current input character that defines an incoming data; fetching the next state transition for the current state from a leader transition table comprising the plurality of leader state transitions within a memory circuit of the hardware accelerator circuit, when the current state is a leader state; and fetching the next state transition for the current state selectively from the leader transition table or a member transition table within the memory circuit based on an information of the respective member transition bitmask, when the current state is a member state, wherein the member transition table comprises only the member state transitions of the plurality of member state transitions that are different from the leader state transitions for a respective character within each group.

Example 22 is a method including the subject matter of example 21, wherein fetching the next state transition for the current state comprising a leader state comprises determining a leader transition address that indicates the address of the next state transition in the leader state table based on fetching information from an address mapping table within the memory circuit during a first clock cycle; and fetching the next state transition from the determined leader transition address in the leader transition table during a second, different clock cycle.

Example 23 is a method including the subject matter of examples 21-22, including or omitting elements, wherein fetching the next state transition for the current state comprising a member state comprises fetching the next state transition from the leader transition table, when the member transition bitmask associated with the respective member state transition indicates that the member state transition and the leader state transition for the corresponding character are the same; and fetching the next state transition from the member transition table, when the member transition bitmask associated with the respective member state transition indicates that the member state transition and the leader state transition for the corresponding character are different.

Example 24 is a method including the subject matter of examples 21-23, including or omitting elements, wherein fetching the next state transition for the current state comprising a member state from the leader transition table comprises fetching information corresponding to the group associated with the current state from the address mapping table during a first clock cycle; fetching a leader state transition from a leader transition address in the leader transition table, computed based on the information fetched from the address mapping table, fetching the member transition bitmask associated with the respective member state from a member bitmask table within the memory circuit and using the leader state transition fetched from the leader transition table as the next state transition, during a second, different clock cycle, when the member transition bitmask associated with the respective member state indicates that the member state transition and the leader state transition for the current input character are the same.

Example 25 is a method including the subject matter of examples 21-24, including or omitting elements, wherein fetching the next state transition for the current state comprising a member state from the member transition table comprises fetching information corresponding to the group associated with the current state from the address mapping table during a first clock cycle; fetching a leader state transition from a leader transition address in the leader transition table, computed based on the information fetched from the address mapping table, fetching the member transition bitmask associated with the respective member state from a member bitmask table within the memory circuit and determining a member transition address that indicates the address of the next state transition in the member state table based on the information from the address mapping table, during a second, different clock cycle, when the member transition bitmask associated with the respective member state indicates that the member state transition and the leader state transition for the current input character are different; and fetching the next state transition from the determined member transition address in the member transition table during a third, different clock cycle.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A hardware accelerator system for signature matching in a distributed network system comprising one or more hardware accelerator circuits, wherein each of the hardware accelerator circuit utilizes a compressed deterministic finite automata (DFA) comprising a state table representing a database of digital signatures defined by a plurality of states and a plurality of characters, wherein the plurality of states are divided into groups, each group comprising a leader state having a plurality of leader state transitions and one or more member states, each having a plurality of member state transitions, the one or more hardware accelerators comprising:
   a memory circuit configured to store,
      the leader state transitions within each group of the compressed DFA;
      only the member state transitions that are different from the leader state transitions for a respective character within each group of the compressed DFA; and
      member transition bitmasks associated respectively with the one or more member states, wherein each of the member transition bitmasks comprises a plurality of bitmasks that identify the member state transitions within the respective member state that are different from the leader state transitions for a respective character within each group of the compressed DFA.

2. The system of claim 1, wherein the one or more hardware accelerator circuits further comprises a processing circuit configured to fetch a next state transition from the leader state transitions or the member state transitions in the memory circuit, based on the information of a current state, a current input character and, when the current state is a member state, the member transition bitmask.

3. The system of claim 2, wherein the processing circuit is further configured to receive the current state and the current input character prior to fetching the next state transition.

4. system of claim 2, wherein the current state is defined by a group ID that identifies the group in the compressed DFA to which the current state belongs and a member ID that identifies if the current state is a leader state or a member state.

5. The system of claim 2, wherein the memory circuit comprises a leader transition table configured to store the leader transitions within each group of the compressed DFA and a member transition table configured to store the member state transitions that are different from the leader state transitions for a respective character within each group of the compressed DFA.

6. The system of claim 5, wherein the memory circuit further comprises a member bitmask table configured to store the plurality of member transition bitmasks associated with the one or more member states within each group and a previous transition count that indicates a count of the member state transitions that are different from the corresponding leader state transitions, before the respective member state in each group.

7. The system of claim 6, wherein the memory circuit further comprises an address mapping table configured to store,
   a leader transition base address of each group within the leader transition table;
   a member transition base address of each group within the member transition table;
   member transition bitmask and previous transition count base address of each group within the member bitmask table; and
   an overall bitmap of each group.

8. The system of claim 7, wherein the processing circuit is configured to fetch the next state transition from the leader transition table,
   when the current state is a leader state, or
   when the current state is a member state and the member transition bitmask from the member bitmask table for the respective member state indicates that a member state transition of the respective member state and a leader state transition for the current input character are the same.

9. The system of claim 8, wherein the processing circuit is further configured to determine a leader transition address that indicates the address of the next state transition in the leader state table based on the leader transition base address and the overall bitmap from the address mapping table, prior to fetching the next state transition from the leader transition table.

10. The system of claim 7, wherein the processing circuit is configured to fetch the next state transition from the member transition table, when the current state is a member state and the member transition bitmask from the member bitmask table for the respective member state indicates that a member state transition of the respective member state and a leader state transition for the current input character are different.

11. The system of claim 10, wherein the processing circuit is further configured to determine a member transition address that indicates the address of the next state transition in the member state table based on the member transition base address and the previous transition count from the address mapping table, and a count of the bitmasks of member state transitions that are different from the corresponding leader state transitions for the current state before the current input character, prior to fetching the next state transition from the member transition table.

12. The system of claim 1, wherein the DFA associated with the one or more hardware accelerator circuits are the same.

13. The system of claim 1, wherein the DFA associated with the one or more hardware accelerator circuits is different.

14. The system of claim 13, wherein a plurality of signatures associated with an application is split between the DFA associated with the one or more hardware accelerator circuits.

15. The system of claim 1, wherein the one or more hardware accelerators are selectively activated based on the system requirements.

16. A method for compression of a deterministic finite automata (DFA) comprising a state table representing a database of digital signatures defined by a plurality of states and a plurality of characters, each of the plurality of states having a plurality of next state transitions associated therewith, in a processing circuit, comprising:
    grouping the plurality of states into one or more groups based on an overall bitmap of the respective states, each group comprising a leader state having a plurality of leader state transitions and one or more member states, each having a plurality of member state transitions; and
    assigning member transition bitmasks respectively to the one or more member states within each group, wherein the member transition bitmasks comprises a plurality of bitmasks that identify the member state transitions within the respective member state that are different from the leader state transitions for a respective character.

17. The method of claim 16, further comprising storing the leader state transitions, the member state transitions that are different from the leader state transitions for the respective character and the plurality of member transition bitmasks in a memory circuit.

18. The method of claim 17, further comprising assigning a plurality of bitmaps respectively to the plurality of state transitions within each of the plurality of states of the DFA, forming the overall bitmap for each of the plurality of states, prior to grouping the plurality of states.

19. The method of claim 18, wherein grouping the plurality of states comprises dividing the plurality of states into one or more groups, wherein each of the plurality of states within each group have the same overall bitmap.

20. The method of claim 16, wherein assigning the member transition bitmask comprises assigning a first bitmask to the member state transitions that are different from the leader state transitions for the respective character, and assigning a second, different bitmask to the member state transitions that are same as the leader state transitions for the respective character.

21. A method for fetching a next state transition from a compressed deterministic finite automata (DFA) using a processing circuit in a hardware accelerator circuit of signature matching hardware accelerator system, wherein the DFA comprises a state table representing a database of digital signatures defined by a plurality of states and a plurality of characters, wherein the plurality of states are divided into groups, each group comprising a leader state having a plurality of leader state transitions and one or more member states, each having a plurality of member state transitions and wherein each of the member state is associated a member transition bitmask comprising a plurality of bitmasks that identify the member state transitions within the respective member state that are different from the leader state transitions for the respective character, comprising:
    receiving information on a current state and a current input character that defines an incoming data;
    fetching the next state transition for the current state from a leader transition table comprising the plurality of leader state transitions within a memory circuit of the hardware accelerator circuit, when the current state is a leader state; and
    fetching the next state transition for the current state selectively from the leader transition table or a member transition table within the memory circuit based on an information of the respective member transition bitmask, when the current state is a member state, wherein the member transition table comprises only the member state transitions of the plurality of member state transitions that are different from the leader state transitions for a respective character within each group.

22. The method of claim 21, wherein fetching the next state transition for the current state comprising a leader state comprises,
    determining a leader transition address that indicates the address of the next state transition in the leader state table based on fetching information from an address mapping table within the memory circuit during a first clock cycle; and
    fetching the next state transition from the determined leader transition address in the leader transition table during a second, different clock cycle.

23. The method of claim 21, wherein fetching the next state transition for the current state comprising a member state comprises,
    fetching the next state transition from the leader transition table, when the member transition bitmask associated with the respective member state transition indicates that the member state transition and the leader state transition for the corresponding character are the same; and
    fetching the next state transition from the member transition table, when the member transition bitmask associated with the respective member state transition indicates that the member state transition and the leader state transition for the corresponding character are different.

24. The method of claim 21, wherein fetching the next state transition for the current state comprising a member state from the leader transition table comprises,
    fetching information corresponding to the group associated with the current state from the address mapping table during a first clock cycle;
    fetching a leader state transition from a leader transition address in the leader transition table, computed based on the information fetched from the address mapping table,
    fetching the member transition bitmask associated with the respective member state from a member bitmask table within the memory circuit and using the leader state transition fetched from the leader transition table as the next state transition, during a second, different clock cycle, when the member transition bitmask associated with the respective member state indicates that the member state transition and the leader state transition for the current input character are the same.

25. The method of claim 21, wherein fetching the next state transition for the current state comprising a member state from the member transition table comprises, fetching information corresponding to the group associated with the current state from the address mapping table during a first clock cycle;

fetching a leader state transition from a leader transition address in the leader transition table, computed based on the information fetched from the address mapping table, fetching the member transition bitmask associated with the respective member state from a member bitmask table within the memory circuit and determining a member transition address that indicates the address of the next state transition in the member state table based on the information from the address mapping table, during a second, different clock cycle, when the member transition bitmask associated with the respective member state indicates that the member state transition and the leader state transition for the current input character are different; and fetching the next state transition from the determined member transition address in the member transition table during a third, different clock cycle.

* * * * *